(12) United States Patent
Sugiyama et al.

(10) Patent No.: US 7,165,590 B2
(45) Date of Patent: Jan. 23, 2007

(54) HEAVY DUTY PNEUMATIC RADIAL TIRE WITH CARCASS PLY WINDING-UP PORTION

(75) Inventors: Naoki Sugiyama, Kobe (JP); Minoru Nishi, Kobe (JP); Hirotoshi Ohtsuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/967,300

(22) Filed: Oct. 19, 2004

(65) Prior Publication Data

US 2005/0109441 A1 May 26, 2005

(30) Foreign Application Priority Data

| Nov. 26, 2003 | (JP) | ............................. 2003-395922 |
| Dec. 9, 2003 | (JP) | ............................. 2003-410760 |
| Dec. 19, 2003 | (JP) | ............................. 2003-423348 |
| Dec. 19, 2003 | (JP) | ............................. 2003-423349 |

(51) Int. Cl.
*B60C 1/00* (2006.01)
*B60C 9/08* (2006.01)
*B60C 15/00* (2006.01)
*B60C 15/04* (2006.01)
*B60C 15/06* (2006.01)

(52) U.S. Cl. .................. 152/540; 152/543; 152/547; 152/552; 152/564

(58) Field of Classification Search ................ 152/540, 152/543, 552, 547, 564
See application file for complete search history.

(56) References Cited

U.S. PATENT DOCUMENTS 2,888,058 A * 5/1959 Manis et al. ................ 152/543
2,982,328 A * 5/1961 Luigi et al.
2002/0033219 A1 * 3/2002 Ueyoko
2004/0194864 A1 * 10/2004 Saeki ..................... 152/552 X (Continued)

FOREIGN PATENT DOCUMENTS

JP          64036509 A   *   2/1989

(Continued)

OTHER PUBLICATIONS

English machine translation of JP 8-40026 A.*

*Primary Examiner*—Adrienne C. Johnstone
(74) *Attorney, Agent, or Firm*—Birch, Stewart, Kolasch & Birch, LLP

(57) ABSTRACT

A heavy duty pneumatic radial tire includes a carcass ply, in which a ply folding portion folding a bead core is successively disposed in a ply body. The ply folding portion includes a main portion folded along the bead core, and a winding-up portion extending continuously to the main portion and apart from the bead core. The winding-up portion extends with an inclination of an angle $\theta$ in a direction in which a diameter is increased inward in the tire axial direction, the angle $\theta$ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm.

10 Claims, 11 Drawing Sheets

U.S. PATENT DOCUMENTS

2005/0006018 A1 * 1/2005 Maruoka et al. ........ 152/552 X

FOREIGN PATENT DOCUMENTS

| | | | |
|---|---|---|---|
| JP | 08-040026 A | 2/1996 |
| JP | 11-321244 A | 11/1999 |
| JP | 2000-219016 A | 8/2000 |
| WO | WO-02/102612 A1 * | 12/2002 |

* cited by examiner

HEAVY DUTY PNEUMATIC RADIAL TIRE WITH CARCASS PLY WINDING-UP PORTION

This Nonprovisional application claims priority under 35 U.S.C. § 119(a) on Patent Application No(s). 2003-395922; 2003-410760; 2003-423348; and 2003-423349 filed in Japan on Nov. 26, 2003; Dec. 9, 2003; Dec. 19, 2003; and Dec. 19, 2003, respectively, the entire contents of which are hereby incorporated by reference.

BACKGROUND OF THE INVENTION

1. Field of the Invention

The present invention relates to a heavy duty pneumatic radial tire for use in a truck, a bus and the like, in which the durability of a bead is enhanced while reducing a weight by improving the structure of a winding-up portion of a carcass.

2. Description of the Related Art

As shown in FIG. 8, a carcass has been recently provided with a main unit disposed between bead cores b, b and a ply folding portion a wound around the bead core. Such a ply folding portion a consists of a main portion, which is folded along an inside surface in a tire axial direction, a lower surface in a radial direction and an outside surface in the tire axial direction of the bead core b, and a winding-up portion a1 extending apart from the bead core b. The winding-up portion a1 extends upward from an upper surface bs in the radial direction of the bead core b, and it has been conventionally held between the bead core b and a bead apex rubber c (hereinafter, this bead structure may be referred to as a bead wind structure). Incidentally, the above-described bead structure is disclosed in, for example, Japanese published patent application NOS. H 11-321244 and 2000-219016.

Since the winding-up portion a1 breaking off around the bead core b, that is, not wound around a part of the bead core b in the bead wind structure, a stress at the time of deformation of a tire is not exerted on the winding-up portion a1, thereby effectively suppressing a damage such as a cord looseness starting from the winding-up portion a1. Furthermore, the winding-up portion a1 is short, thus obtaining an advantage of weight reduction of a tire.

On the other hand, although a falling out phenomenon of a carcass ply can be prevented by lockingly holding the winding-up portion a1 between the bead core b and the bead apex rubber c, a locking, or engaging function may become insufficient in the structure per se, since the winding-up portion a1 is relatively short.

This is also, because strong folding-back (that is, so-called spring-back) occurs at the winding-up portion a1, for example, in a green tire molding process since the winding-up portion a1 is short and a folding degree is large. As a result, there may be liable to arise problems of deficient molding due to air remainder such as generation of a cavity between the winding-up portion a1 and the bead core b.

In view of this, the present inventor has devised that a low filled rubber has been previously interposed between the winding-up portion a1 and the bead core b, so that the spring-back is suppressed and the separation of the winding-up portion a1 from the bead core b is decreased by reducing the folding degree.

However, if the winding-up portion a1 is too separated from the bead core b even when the filled rubber is used, the stress exerted on the tip of the winding-up portion a1 becomes large, not to suppress a damage and not to increase the locking force, thereby easily inducing falling up, or loosing. In contrast, if the winding-up portion a1 is not so separated from the bead core b, an impact exerted on the tip becomes large, thereby easily inducing a damage. Moreover, the folding-back remains strong, thereby making it difficult to sufficiently suppress the deficient molding. As a consequence, the problems experienced by the tire in the prior art cannot be solved.

Additionally, as soon as the carcass ply becomes easy to be moved in the falling out direction since the locking force to the winding-up portion a1 becomes weakened owing to the separation, the carcass ply is liable to slide on the bead core b at an inner end position Q in the tire axial direction of the bead core b. Furthermore, it has been found that a damage is likely to occur at the position Q, since a topping rubber of the carcass cord is liable to be split in combination with a strong press-contact force with the bead core b.

Japanese published patent application No. H 08-40026 discloses that a cord layer e is attached to the outer surface of a winding-up portion a1, thereby achieving reinforcement and reducing spring-back, as shown in FIG. 9. However, the cord layer e disclosed in the above-described gazette is inclined in a direction in which a diameter is reduced inward in a tire axial direction. As a consequence, creases or wrinkles are liable to be generated at the end of the winding-up portion a1, thereby easily inducing generation of air remainder, as shown in FIG. 10.

SUMMARY OF THE INVENTION

In the present specification, a dimension or the like of each of parts of a tire is set to a specified value in a filled state of 50 kPa, in which a tire is assembled in a regular rim while filling an inner pressure of 50 kPa, unless stated otherwise. Here, "the regular rim" signifies a rim determined per tire on the basis of a standard system including a standard of a tire: for example, a standard rim in conformity of JATMA, "a design rim" in conformity of TRA or "a measuring rim" in conformity of ETRTO.

A heavy duty pneumatic radial tire according to the invention as claimed in claim 1 includes a carcass ply, in which a ply folding portion folded from inside to outside in a tire axial direction around a bead core is successively disposed in a ply body extending from a tread to the bead core in a bead via a sidewall.

Furthermore, the ply folding portion includes a main portion folded along an inside surface in the tire axial direction of the bead core, a lower surface in a radial direction and an outside surface in the tire axial direction, and a winding-up portion extending continuously to the main portion and apart from the bead core.

Moreover, the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled.

Additionally, the angle θ is set to 20 to 65 degrees with respect to an upper surface in the radial direction of the bead core, a distance La from the upper surface in the radial direction of the bead core at the tip of the winding-up portion is set to 5 mm to 15 mm (preferably 12 mm), and a distance Lb between the tip of the winding-up portion and the ply body is set to 1 mm to 5 mm.

Consequently, it is possible to provide a heavy duty pneumatic radial tire having excellent durability, in which a damage at the tip of the carcass ply, generation of falling out (blowing) and deficient molding can be suppressed.

According to the invention as claimed in claim 2, the bead core has a core maximum width w of 15 mm to 19 mm, and further, the range of ratio La/w is set from 0.26 to 0.80.

In this manner, it is possible to enhance the stability of the bead core and accurately set the shape and position of the winding-up portion in the carcass cord to be wound around the bead core by using the wide bead core. Consequently, it is easy to stably hold the distance La at 5 mm to 15 mm (preferably 12 mm) and the distance Lb at 1 mm to 5 mm with ease, thereby enhancing the durability of the bead.

According to the invention as claimed in claim 3, a cord layer passing through the outer surface of the winding-up portion is inclined in a diameter increasing direction inward in a tire axial direction. Consequently, it is possible to prevent any easy generation of creases or wrinkles at the carcass ply in the vicinity of the outer end of the winding-up portion or any variation at the carcass cord. Furthermore, it is possible to prevent any vulcanization due to air enclosure between the winding-up portion and the bead core by the cord layer. Thus, it is possible to provide a stable and firm tire.

According to the invention as claimed in claim 6, the ratio L1/L0 of a radial height L1 from a bead base line at the tip thereof to a radial height L0 from the bead base line at an inner surface of the ply body on a tire equator is set to 0.07 to 0.12 in the winding-up portion.

In this manner, a heavy duty pneumatic radial tire, in which excellent bead durability in a bead wind structure can be provided.

According to the invention as claimed in claim 7, the bead core has a tensile strength T0 of 150 kN to 270 kN, and further, a tensile strength T1 per carcass cord is set 0.0045 to 0.0086 times the tensile strength T0 of the bead core and the implanting number of carcass cords is set to 30 pieces to 45 pieces per 5 cm in the winding-up portion.

In this manner, the heavy duty pneumatic radial tire is provided, in which the excellent bead durability in the bead wind structure can be maintained by restricting the tensile strength and implanting number of carcass cords at the winding-up portion also in the case where the tip is separated from the bead core.

Since the invention as claimed in any one of claims 8 to 11 is provided with a feature of each of materials, the object is to provide the heavy duty pneumatic radial tire, in which the bead durability can be enhanced by suppressing a damage at the tip and/or a damage at the inner end in the tire axial direction of the bead core.

BRIEF DESCRIPTION OF THE DRAWINGS

FIGS. 6A and 6B illustrate the cord layer, wherein FIG. 6A is a perspective view showing a cord layer obtained by winding plies in superimposition and FIG. 6B is a perspective and schematic diagram showing a cord layer formed by spirally winding cords;

DESCRIPTION OF THE PREFERRED EMBODIMENTS

Figure 1:
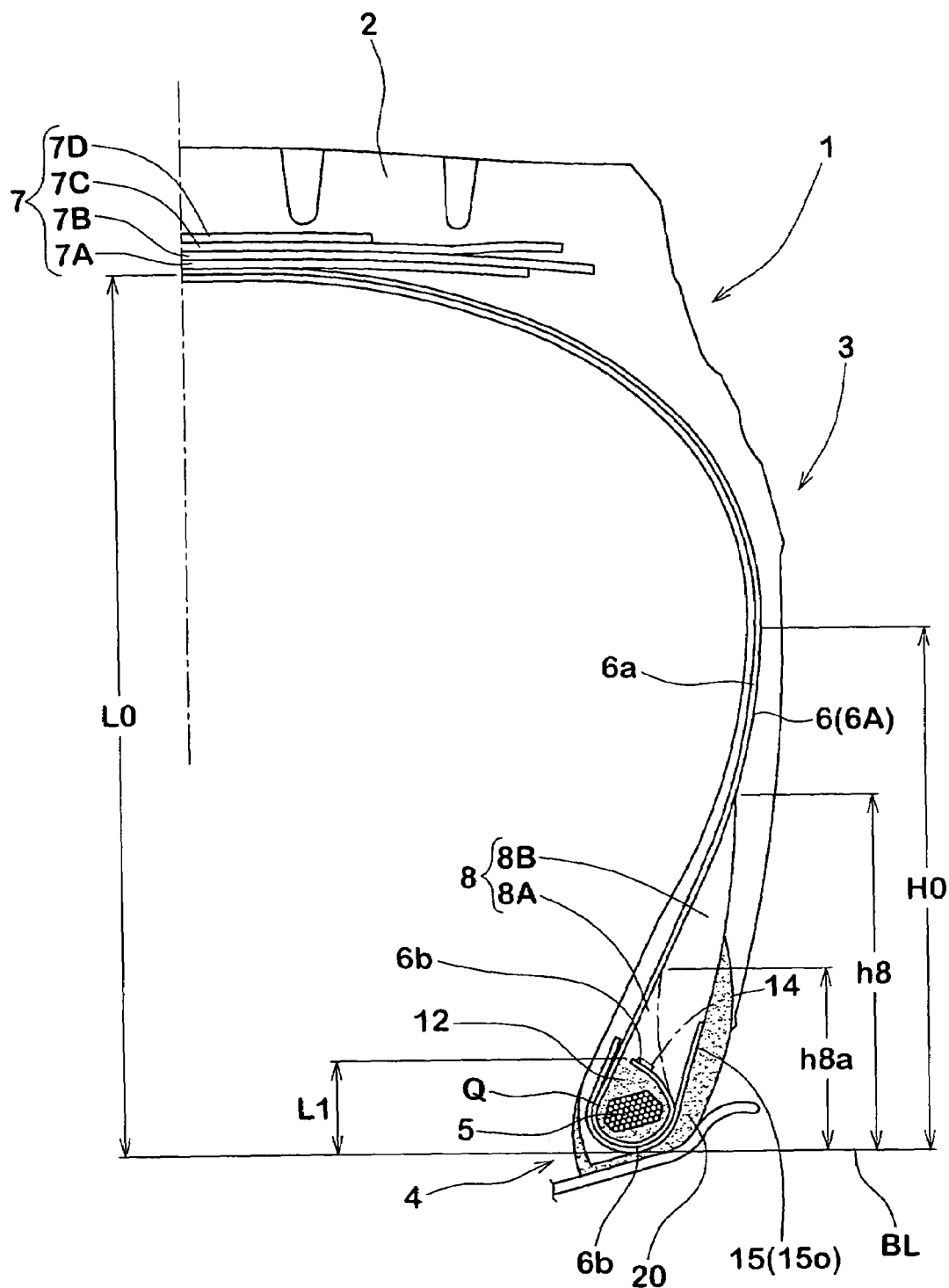
FIG. 1 is a cross-sectional view showing a heavy duty tire in a 50 kPa filled state in a preferred embodiment.

In FIG. 1, a heavy duty pneumatic radial tire 1 (hereinafter simply referred to also as a tire 1) includes a carcass 6 extending from a tread 2 to a bead core 5 at a bead 4 through a sidewall 3, and a belt layer 7 disposed outside in a radial direction of the carcass 6 and inward of the tread 2. Furthermore, in the present preferred embodiment, there is provided a substantially U-shaped bead reinforcing layer 15 at the bead 4 in order to alleviate falling-down of the bead at the time of application of duty.

Figure 3:
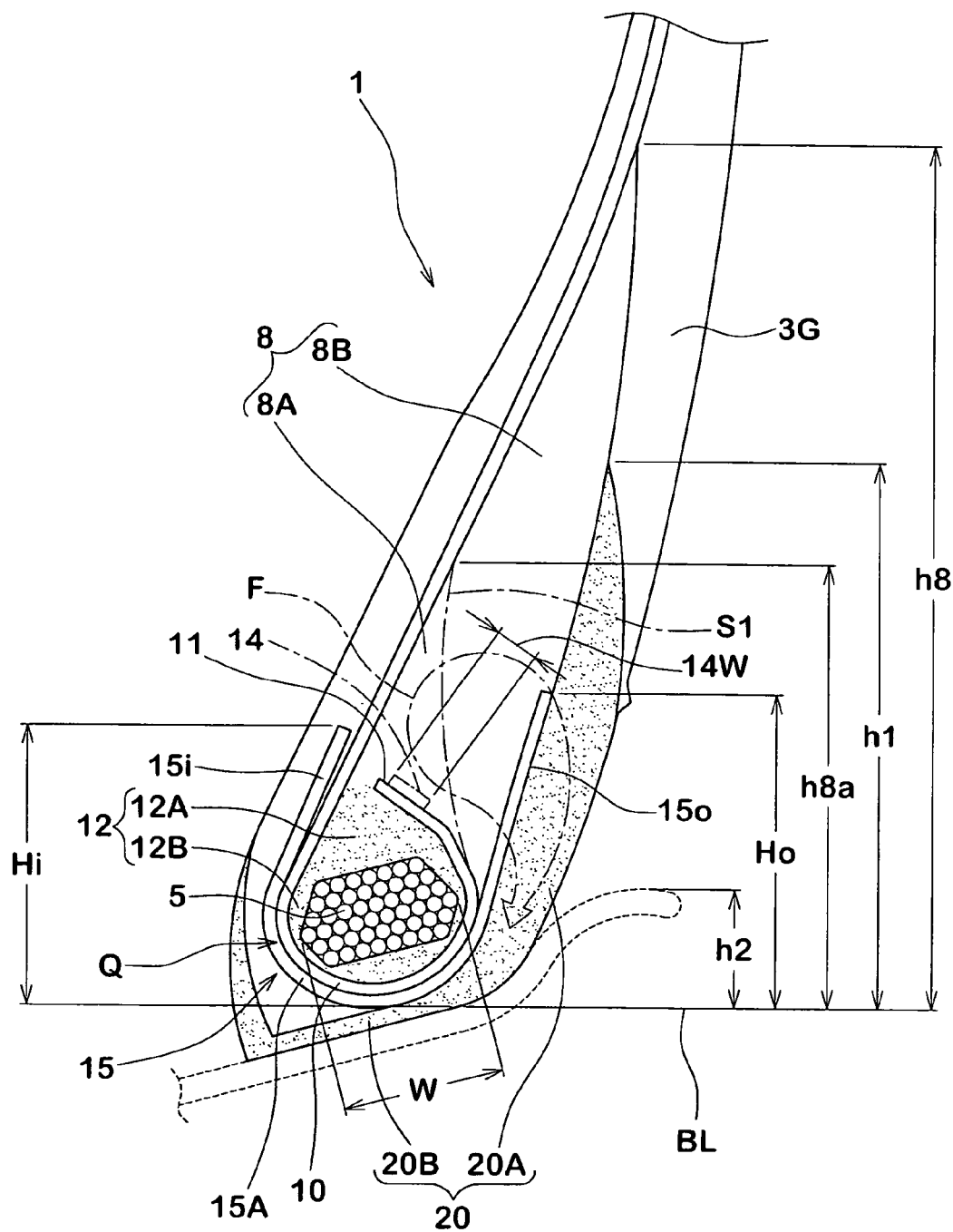
FIG. 3 is a cross-sectional view showing the bead of the heavy duty tire in enlargement.

As shown in FIG. 3, the bead 4 further includes a bead apex rubber 8 extending outward in a tire radial direction in the bead 4, and a clinch rubber 20 provided in a region in contact with a rim, for preventing the bead 4 carrying out the position gap from the rim.

The belt layer 7 is formed of two or more of belt plies by the use of belt cords (normally, three or more in the case of the heavy duty pneumatic radial tire). In the present preferred embodiment, the belt layer 7 consisting of a steel cord is configured in a four-ply structure, in which a first belt ply 7A is arranged on an innermost side in a radial direction at an angle of, for example, 60 to 15 degrees with respect to a tire circumferential direction, and second to fourth belt plies 7B to 7D are arranged at as small an angle as, for example, 10 to 35 degrees with respect to the tire circumferential direction. These belt plies 7A to 7D enhance belt rigidity and reinforce the tread 2 by a hoop effect by disposing at which the belt cords cross each other between the plies in superimposition.

The carcass 6 is formed of one carcass ply 6A, in which a carcass cord is arranged at an angle of 70 to 90 degrees with respect to the tire circumferential direction. Although a steal cord is suitable for the carcass cord, an organic fiber cord made of nylon, rayon, polyester or aromatic polyamide may be used, as required. The carcass ply 6A is provided with a ply folding portion 6b, which is folded from inside to outside in the tire axial direction around the bead cores 5, successively on both sides of a ply body 6a over between the bead cores 5 and 5.

Figure 2:
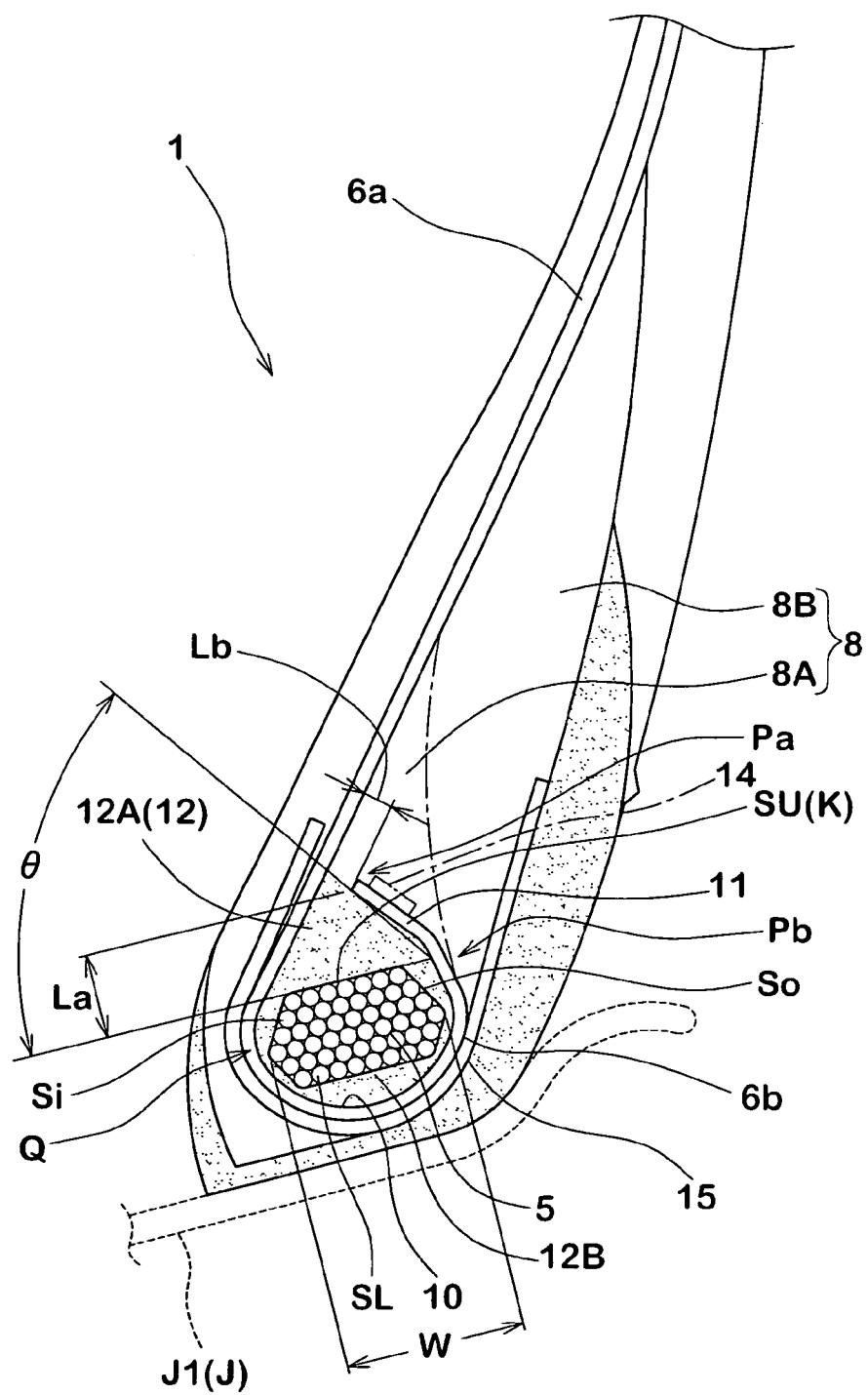
FIG. 2 is a cross-sectional view showing a bead of the heavy duty tire in enlargement.

As shown in FIG. 2, the bead core 5 is formed into a ring shape by winding a bead wire made of, for example, steel at multiple stages and rows. In the present preferred embodiment, there is illustrated the bead core 5 formed into a flat hexagonal shape long in a lateral direction as viewed in cross section. The bead core 5 has an enhanced fitting force with respect to a rim over a wide range by aligning a radial lower surface SL substantially in parallel to a rim seat J1 of a regular rim J. In the present preferred embodiment, there is illustrated the case where the regular rim J is a tubeless 15 degree tapered rim. Therefore, the radial lower surface SL and an upper surface SU of the bead core 5 are inclined at an angle of almost 15 degrees with respect to the tire axial direction. The cross-sectional shape of the bead core 5 may be a hexagonal or rectangular shape, as necessary.

The ply folding portion 6b includes a main portion 10 bent along an inner surface Si in the tire axial direction, the radial lower surface SL and an outer surface So in the tire axial direction in the bead core 5, and the winding-up portion 11 extending continuously to the main body 10 and apart from the bead core 5. Also, the winding-up portion 11 has an intervening filled rubber 12 between an upper surface SU in a radial direction of the bead core 5, extends with an inclination of an angle θ, as described later.

Moreover, the ply folding portion 6b of the carcass 6 is configured in a so-called bead wind structure in which the ply folding portion 6b is wound around the circumference of the bead core 5, and further, the winding-up portion 11 is lockingly held between the ply folding portion 6b and the bead apex rubber 8. The winding-up portion 11 includes a cord layer 14 passing an outer surface in the tire radial direction.

Figure 4:
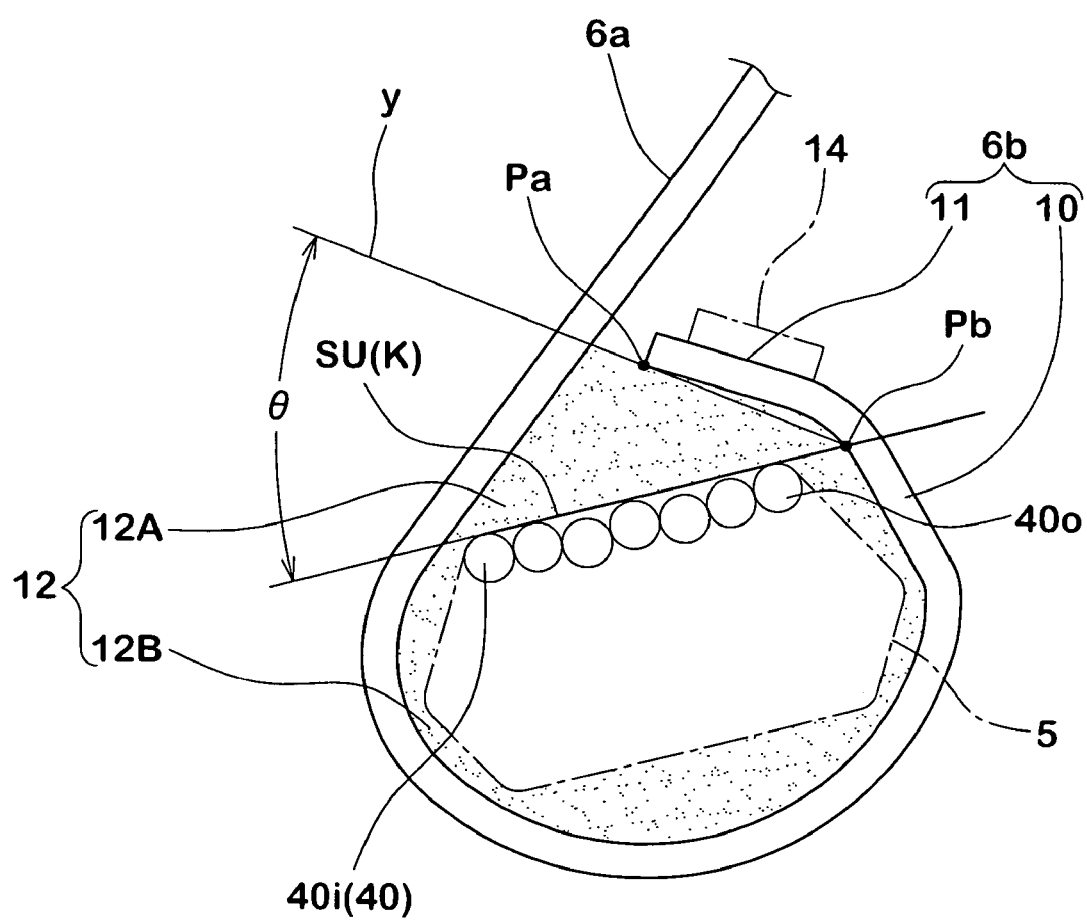
FIG. 4 is a cross-sectional view showing a bead core of the heavy duty tire in enlargement.

AS shown in FIG. 4 with exaggeration, the winding-up portion 11 almost designates a range projecting outward in the radial direction from a tangent K with the radial upper surface SU of the bead core 5. Moreover, the winding-up portion 11 slantwise extends toward the ply body 6a, that is, in such a manner as that its diameter is increased inward in the tire axial direction, at an acute angle θ (smaller than 90 degrees) with respect to the radial upper surface SU of the bead core 5. The angle θ is defined as an inclination line y with respect to the tangent K. The inclination line y passes an inner end point Pa and an intersection (an outer point Pb), where the tangent K passing the inner surface of the winding-up portion 11. Incidentally, although the winding-up portion 11 is formed into a bending shape bent in a substantial v shape in the present preferred embodiment, it may be formed into a straight shape or a curved shape such as an arcuate shape.

As shown in FIG. 4, a bead wire 40 is not aligned but arranged with vertical variations in the bead core 5, and therefore, the radial upper surface SU may be not a flat surface. In such a case, the radial upper surface SU is defined as the tangent K in contact with a bead wire 40o positioned on an outermost side in the radial direction (a wire positioned on an outermost side in the tire axial direction at the upper surface SU in FIG. 4) and a bead wire 40i positioned on an innermost side in the radial direction (a wire positioned on an innermost side in the tire axial direction at the upper surface SU in FIG. 4) in a bead wire row (i.e. an upper row) forming the upper surface SU.

In the tire 1, there are defined the angle θ of the inner end point Pa of the winding-up portion 11, a distance La from the radial upper surface SU of the bead core 5 at the inner end point Pa of the winding-up portion 11 and a distance Lb from the ply body 6a at the inner end point Pa, by the use of a filled rubber 12.

In the present preferred embodiment, the filled rubber 12 is preferably exemplified by a preferred case, in which the filled rubber 12 is formed of a basic portion 12A of a substantially triangular shape as viewed in cross section disposed among the radial upper surface SU of the bead core 5, the winding-up portion 11 and the ply body 6a, and a relatively thin filling layer 12B interposed between the inner surface Si in the tire axial direction of the bead core 5, the radial lower surface SL, the outer surface so in the tire axial direction of the bead core 5, and the main portion 10 of the winding-up portion 6b. Incidentally, the filled rubber 12 may be formed of only the basic portion 12A.

A damage at the inner end position (tip) Pa, such as a falling out (blowing) and the deficient molding are suppressed by restricting the angle θ of the line y passing the inner end position Pa with respect to the radial upper surface SU of the bead core 5 within a range from 20 to 65 degrees.

If the angle θ is less than 20 degrees, the bending degree of the winding-up portion 11 cannot be sufficiently reduced, thereby inducing the insufficient suppression of the generation of the deficient molding. Furthermore, since a large shock is exerted at the inner end position (tip) Pa at the time of grounding, a damage at the inner end position Pa is liable to occur. In contrast, since a stress at the time of tire deformation tends to be strongly exerted at the inner end position Pa if the angle q exceeds 65 degrees, a damage is liable to occur at the inner end position Pa, and further, the locking force to the carcass ply 6b becomes weak, thereby having the disadvantage of the falling out. The angle θ preferably ranges from 25 to 55 degrees, more preferably, from 30 to 50 degrees.

The distance La from the radial upper surface SU of the bead core 5 at the inner end position Pa of the winding-up portion 11 ranges from 5 mm to 15 mm; preferably, from 5 mm to 12 mm; and more preferably, from 7 mm to 12 mm. The distance Lb from the ply body 6a at the tip Pa within a range from 1 mm to 5 mm. If the distance Lb is less than 1 mm, the tip of the carcass cord and the carcass cord of the ply body 6a are fretted on each other in contact due to variations in forming the tire or tire deformation during traveling, thereby inducing a damage on the cord such as fretting. In contrast, if the distance Lb exceeds 5 mm, the locking force to the winding-up portion 11 is reduced, thereby having the disadvantage of the falling out.

In other words, the filled rubber 12 having the basic portion 12A of a substantially triangular shape as viewed in cross section is disposed, and further, the distance La is set within the range of 5 mm to 15 mm, that is, is secured to be 5 mm or more, as described above. Consequently, it is possible to reduce the bending degree of the winding-up portion 11, suppress the spring-back of the winding-up portion 11 and suppress the generation of the deficient molding such as air remainder. Incidentally, if the distance La exceeds 15 mm (preferably, 12 mm), there is a tendency that the stress at the time of the tire deformation is strongly exerted at the tip Pa of the winding-up portion 11, thereby inducing a damage such as cord looseness starting from the tip Pa. Therefore, the distance La preferably ranges from 7 mm to 12 mm, as described above.

The inner end position Pa can be located in a region of small distortion during traveling, thus enhancing the durability of the bead 4. The winding-up portion 11 is inclined in the direction in which its diameter is increased inward in the tire axial direction, thus suppressing the generation of creases or wrinkles in the vicinity of the inner end position Pa. Moreover, since the filled rubber 12 is filled in the space defined between the winding-up portion 11 and the bead core 5, it is possible to prevent any formation of an air sump (or air cell) by deforming the filled rubber 12 along the creases generated at the winding-up portion 11, pushing out the air at the time of vulcanization even if the creases are generated at the time of molding, unlike in the prior art.

Additionally, according to the present invention, a wide core having a core maximum width w of 15 mm to 19 mm is used as the bead core 5, and therefore, the distance La from the radial upper surface su (the tangent K in the case of the non-flat radial upper surface su) at the inner end point Pa of the winding-up portion 11 can be restricted 0.26 to 0.80 times the core maximum width w (the ratio La/W can be restricted within a range from 0.26 to 0.80).

As described above, the angle θ of the line y passing through the tip Pa ranges from 20 to 65 degrees, the distance La from the radial upper surface SU of the bead core 5 at the tip Pa ranges from 5 mm to 15 mm, and the distance Lb from the ply body 6a ranges from 1 mm to 5 mm, and further, the height La is set 0.26 times or more to 0.80 times (preferably 0.75 or 0.60 times) or less the core maximum width W. Consequently, it is possible to reduce the bending degree of the winding-up portion 11, suppress the spring-back of the winding-up portion 11 and suppress the generation of the deficient molding such as the air remainder. Incidentally, if the height La is less than 0.26 times, the spring-back cannot be sufficiently suppressed, and further, a damage at the tip Pa is liable to occur since a large shock is exerted at the tip Pa at the time of grounding. In contrast, if the height La exceeds 0.80 times the core maximum width W, there is a tendency that the stress at the time of the tire deformation is strongly exerted at the tip Pa, thereby inducing a damage at the tip Pa.

Here, the bead core 5 is stably fitted to the rim as the core maximum width W becomes greater in excess of 15 mm, thereby weakening force for rotating the bead core 5 at the time of the application of duty. This is advantageous in suppressing the deformation of the bead, thus alleviating the stress at the time of the deformation of the bead, which is exerted at the inner end point Pa. The reduced rotating force to be exerted on the bead core 5 is effective in suppressing the falling out (blowing) of the carcass ply 6b at the time of the application of the duty. As a result, an upper limit of the distance La can be substantially increased, so that its proper range can be enlarged toward the upper limit, thereby readily securing the proper range. However, since the entire width of the bead 4 depends upon the size of the tire, the core maximum width W also has a limit, which is restricted to 19 mm or less in the heavy duty tire according to the present invention.

Subsequently, according to the present invention, the angle $\theta$ ranges from 20 to 65 degrees, the distance La ranges from 5 mm to 15 mm, the distance Lb ranges from 1 mm to 5 mm, and further, the ratio L1/L0 of a radial height L1 from a bead base line at the inner end portion (tip) Pa of the winding-up portion 11 to a radial height L0 from the bead base line at an inner surface of the ply body on a tire equator can be set to 0.07 to 0.12.

In this manner, the filled rubber 12 having the basic portion 12A of a substantially triangular shape as viewed in cross section is disposed, and further, the height L1 of the winding-up portion 11 is securely set 0.07 times or more the height L0 of the ply body 6a. Consequently, it is possible to reduce the bending degree of the winding-up portion 11, suppress the spring-back of the winding-up portion 11 and suppress the generation of the deficient molding such as the air remainder. Incidentally, if the height L1 is less than 0.07 times, the spring-back cannot be sufficiently suppressed, and further, a damage at the tip Pa is liable to occur since a large shock is exerted at the tip Pa at the time of grounding. In contrast, even if the height L1 exceeds 0.12 times the height L0 of the ply body 6a, there is a tendency that the stress at the time of the tire deformation is strongly exerted at the tip Pa, thereby inducing a damage at the tip Pa. Namely, in either case, the excellent bead durability of the bead wind structure cannot be maintained.

Furthermore, according to the present invention, the angle $\theta$ ranges from 20 to 65 degrees, the distance La ranges from 5 mm to 15 mm and the distance Lb ranges from 1 mm to 5 mm, and further, a damage on the winding-up portion 11 may be suppressed by restricting a tensile strength T1 per carcass cord and the implanting number of carcass cords.

Specifically, the tensile strength T1 per carcass cord is set 0.0045 to 0.0086 times a tensile strength T0 of the bead core 5 and the implanting number of carcass cords is set to 30 to 45 pieces per 5 cm in the winding-up portion 11.

This is because the thinning degree becomes higher since the rubber between the cords stretches in a winding-up process if the implanting number of carcass cords in the winding-up portion 11 is less than 30 pieces per 5 cm, thereby leading to insufficient coating of the cord, and as a result, resistance against the stress or the shock is reduced, so that a damage is liable to occur in the winding-up portion 11. Consequently, according to the first invention, the stress or the shock per se is reduced, thereby suppressing a damage in the winding-up portion 11; in contrast, according to the second invention, the implanting number is increased up to 30 pieces or more per 5 cm, so that a damage in the winding-up portion 11 can be suppressed by increasing the resistance against the stress or the shock. Incidentally, if the implanting number exceeds 45 pieces per 5 cm, disturbance is liable to occur at a cord end in the winding-up process, thereby causing the reduction of the resistance against the stress or the shock in the same manner as described above.

At this time, it is important that the tensile strength T1 per carcass cord is set 0.0045 times or more the tensile strength T0 of the bead core 5. If the tensile strength T1 is less than 0.0045 times, a required carcass strength cannot be secured, thereby inducing a tendency of a damage on a carcass such as cutting-out of the cord. In contrast, if the tensile strength T1 exceeds 0.0086 times, the cord becomes rigid as well as an excessive quality, and as a result, the spring-back becomes large in a green tire molding process, thereby inducing a disadvantage in suppressing the deficient molding. Incidentally, the tensile strength T0 of the bead core is set within a range of 150 kN to 270 kN from the viewpoint of rim assemblage and the fitting force to the rim.

Here, the tensile strengths T1 and T0 are a maximum duty required for cutting a sample measured at a tensile speed of 5 cm/min., respectively, in conformity with a tension test in regard to a cutting duty and a whole elongation at the time of cutting (Item 6.4) in "Steel Tire cord Test Method" of JIS G3510.

The bead reinforcing layer 15 is adapted to further alleviate the falling-down of the bead at the time of the application of the duty and suppress the damage at the tip Pa of the winding-up portion 11, and it is curved into a substantial u shape. The bead reinforcing layer 15 consists of the cord plies obtained by arranging steel cords at an angle of, for example, 10 to 40 degrees with respect to the tire circumferential line. AS shown in FIG. 3, the bead reinforcing layer 15 includes a curved portion 15A passing inward in the radial direction along the main portion 10 of the ply folding portion 6b, an outer piece 15o inclined outside in the tire axial direction outward in the radial direction and apart from the main portion 10 outside in the tire axial direction of the curved portion 15A, and an inner piece 15i extending along the inside surface in the tire axial direction of the ply body 6a inside in the tire axial direction of the curved portion 15A.

The inner piece 15i serves as reinforcement, for example, to suppress the falling-down of the carcass ply 6A at the time of the application of the duty and more reduce the distortion at the tip Pa. Consequently, a radial height Hi of the inner piece 15i from a bead base line BL is preferably set to 10 mm or more, more preferably, to 25 mm or more. However, if the radial height Hi exceeds 60 mm, a damage is liable to occur at the tip of the inner piece 15i due to the concentration of the stress.

The outer piece 15o serves to suppress a damage peculiar to the bead wind structure such as generation of cord looseness at the carcass cord at an inner end position Q in the tire axial direction of the bead core 5. As a consequence, a radial height Ho of the outer piece 15o from the bead base line BL is preferably set to 20 mm or more.

The bead reinforcing layer 15 prevents any generation of a damage peculiar to the bead wind structure at the position Q. In the bead wind structure, a damage is caused since the carcass ply 6A falls down relatively largely at the time of the application of the duty and thermal softening caused by an excessive increase in temperature of the rubber inside of the bead due to heat of a brake pad on a vehicle side according to a driving situation. That is to say, the rubber inside of the bead softened due to the heat at the time of the application of the duty tends to be pressed between a flange and the bead, to be thus moved toward a bead toe. At this time, since the ply folding portion 6b is moved following the movement of the rubber, it is estimated that a large shearing distortion is generated between the carcass ply 6A and the bead core 5 at the position Q, so as to induce the cord looseness.

The outer piece 15o exhibits a function as a shielding plate when the radial height Ho becomes as high as 20 mm or more, and therefore, can reduce the rubber movement F toward the bead toe (indicated by an chain line in FIG. 3) by the shielding effect. AS a result, it is possible to reduce the shearing distortion between the carcass ply 6A and the bead core 5 at the position Q, to thus suppress the cord looseness. However, if the radial height Ho exceeds 40 mm, a damage is liable to occur at the tip of the outer piece 15O due to the stress concentration. Thus, the radial height Ho is set to 40 mm or less.

Hereinafter, explanation will be made on the filled rubber 12. If a complex elasticity modulus Ea* of the filled rubber 12 is as soft as less than 2 MPa, the ply folding portion 6b is liable to follow the rubber movement F, thereby disadvantageously inducing a damage at the position Q. AS a consequence, a lower limit of the complex elasticity modulus Ea* is 2 MPa or more; preferably, more than 3 MPa; and more preferably, more than 5 MPa. Furthermore, the lower limit is set to be more than 8 MPa, and preferably, more than 13 MPa.

However, if the lower limit exceeds 25 MPa, a damage is disadvantageously caused at the tip Pa, for example, a shock at the tip Pa of the winding-up portion 11. Therefore, the upper limit is preferably set to 25 MPa or less.

At this time, a high sulfur containing rubber having the sulfur content of 4.0 phr or more as a vulcanizing agent is preferably used as the filled rubber 12. This is because the rubber becomes difficult to be thermally softened in the case where the complex elasticity modulus Ea* is obtained within the above-described range by containing 4.0 phr or more of sulfur. Consequently, also in the case where the bead is excessively increased in temperature due to the heat of the brake pad or the like, the movement of the ply folding portion 6b cannot be promoted due to the thermal softening of the filled rubber 12, thereby maintaining the suppressing effect of the cord looseness. If the content of sulfur exceeds 12 phr, rubber burning is liable to occur due to excessive acceleration of vulcanization, thereby inducing a fear that adhesiveness to an adjacent member is deteriorated. As a result, the content of sulfur preferably ranges from 4.0 phr to 12 phr, wherein its lower limit is preferably 7.0 phr or more or its upper limit is preferably 10 phr or less. Incidentally, a rubber composition for a normal tire contains 1.0 phr to 3.5 phr of sulfur.

In the present preferred embodiment, the bead apex rubber 8 consists of two layers: a lower apex portion 8A having a complex elasticity modulus Eb1* of 35 MPa to 60 MPa and an upper apex portion 8B adjacent to the lower apex portion 8A outward in the radial direction and having a complex elasticity modulus Eb2* greater than the complex elasticity modulus Ea* of the filled rubber 12 but smaller than the complex elasticity modulus Eb1* of the lower apex portion 8A, as shown in FIG. 1. Particularly in the present preferred embodiment, a radial height h8a of the lower apex portion 8A from the bead base line BL ranges from 40% to 60% of the entire height h8 of the bead apex rubber 8, thus offering both of riding comfort and steering stability at the same time.

The inner apex portion 8A is made of a hard rubber having a rubber hardness Hsa (durometer A hardness) of 80 to 95 degrees. In contrast, the outer apex portion 8B is made of a soft rubber having a rubber hardness Hsb (durometer A hardness) of 40 to 70 degrees, which is smaller than the rubber hardness Hsa.

The complex elasticity modulus Eb2* of the outer apex portion 8B at a temperature of 70 degrees is set to 3 MPa or more, which is higher than that of an outer apex portion in a conventional tire, thereby alleviating the falling-down of the bead at the time of the application of the duty and suppressing the damage at the inner end position Pa of the winding-up portion 11. However, if the complex elasticity modulus Eb2* exceeds 10 MPa, the bead rigidity becomes too high to prevent any damage in the vicinity at a radial outer end of the bead apex rubber 8. Therefore, it is necessary to set the complex elasticity modulus Eb2* within 3 MPa to 10 MPa, wherein it is preferable to set a lower limit to 5 MPa or more and an upper limit to 8 MPa or less.

At this time, it is important to set a 100% modulus M100 of the outer apex portion 8B at a temperature of 23 degrees within 2.0 MPa to 4.0 MPa. If the 100% modulus M100 is less than 2.0 MPa, the falling-down of the bead is insufficiently alleviated. In contrast, if the 100% modulus M100 exceeds 4.0 MPa, a damage caused by a difference in elasticity tends to occur between the outer apex portion 8B and an adjacent sidewall rubber 3G.

A radial height h8 of the bead apex rubber 8 from the bead base line BL ranges from 40% to 80% of a carcass ply maximum width height point H0, and further, a radial height h8a of the inner apex portion 8A ranges from 30% to 70% of the height h8 (thus offering both of the riding comfort and the steering stability at the same time). Here, the carcass ply maximum width height point H0 signifies a radial height from the bead base line BL at a point most projecting outward in the tire axial direction of the ply body 6a (i.e., a carcass ply maximum width point).

The clinch rubber 20 is made of rubber which serves as a sheath of the bead 4 and is excellent in abrasion resistance. The clinch rubber 20 includes a clinch base 20A, which constitutes a bead outside surface and rises up to a height position beyond an upper end of a rim flange outward in the radial direction from a bead heel, and a clinch bottom 20B, which constitutes a bead bottom and extends from the clinch base 20A to the bead heel. A radial height h1 of the clinch base 20A from the bead base line BL ranges from 1.5 times to 5.0 (preferably 4.0) times a rim flange height h2. The clinch base 20A is brought into contact with a lower end of the sidewall rubber 3G having a rubber hardness and an elasticity modulus smaller than those of the clinch rubber 20.

The complex elasticity modulus Ea* of the clinch rubber 20 at a temperature of 70 degrees is set to 8 MPa or more, which is higher than that of a clinch rubber in a conventional tire, thereby alleviating the falling-down of the bead at the time of the application of the duty and suppressing the damage at the tip Pa of the winding-up portion 11.

The configuration of the clinch rubber 20 produces an effect also in suppressing the damage at the tip of the outer piece 15o of the bead reinforcing layer 15. However, if the complex elasticity modulus Ec* exceeds 15 MPa, a stress caused by a difference in elasticity is liable to be concentrated between the clinch rubber 20 and the adjacent sidewall rubber 3G, thereby inducing a tendency of the occurrence of a damage starting from a boundary therebetween. Therefore, the complex elasticity modulus Ec* need be set within 8 MPa to 15 MPa. Particularly, it is preferable to set a lower limit to 8 MPa or more and an upper limit to 12 MPa or less.

It also is important to set a product t·e (:t×e) of a tensile strength t (unit: MPa) at a temperature of 23 degrees and an elongation e (unit: %) at the time of cutting of the clinch rubber 20 to 4,000 to 12,000. If the product t·e is less than 4,000, insufficient strength induces breakage due to deformation at a portion in contact with the rim flange. In contrast, if the product t·e exceeds 12,000, the rubber cannot follow the deformation at the time of the application of the duty, thereby inducing breakage. Consequently, the product t·e preferably ranges from 4,000 to 8,000.

The complex elasticity modulus according to the present invention was measured under the condition of a temperature of 70 degrees, at a frequency of 10 Hz and a dynamic distortion factor of 2% by using a viscoelastic spectrometer in conformity with "Dynamic Property Test Method of vulcanized Rubber and Thermoplastic Rubber" of JIS K6394. The tensile strength t, the elongation e at the time of cutting and the 100% modulus M100 were measured at a temperature of 23 degrees in conformity with "Tension Test Method of vulcanized Rubber" of JIS K6251.

Next, according to the present invention, the rubber property of a topping rubber of the carcass ply 6A is restricted as follows: a complex elasticity modulus Ed* of the topping rubber at a temperature of 70 degrees is set to 5 MPa or more, which is higher than that of a carcass topping rubber in a conventional tire. The thus increased rigidity can suppress generation of a split caused by force in press-contact with a bead core 5 and suppress a damage at the position Q. If the complex elasticity modulus Ed* exceeds 13 MPa, the rubber rigidity becomes too high to prevent any damage such as a split at the topping rubber in the vicinity of the carcass ply maximum width point, at which a deformation at the time of the application of the duty is large. Therefore, the complex elasticity modulus Ed* need be set within 5 MPa to 13 MPa. Particularly, it is preferable to set a lower limit to 6 MPa or more and an upper limit to 10 Mpa or less.

It is also necessary to enhance an adhesive strength between the rubber and the cord by adding 2.0 phr or more of sulfur as a vulcanizing agent into the topping rubber so as to increase the sulfur content. In the case where the complex elasticity modulus Ed* within the above-described range is obtained by adding 2.0 phr or more of sulfur, there is produced such a characteristic that the rubber is difficult to be thermally softened. Also in the case where the bead is excessively increased in temperature due to the heat of the brake pad or the like, the movement of the ply folding up portion 6b in the folling out (blowing) direction can be suppressed with the expectation of maintenance of a damage suppressing effect at the position Q. If the content of sulfur exceeds 7 phr, the rubber burning is liable to occur due to the excessive acceleration of the vulcanization, thereby inducing a fear that adhesiveness to an adjacent member is deteriorated. As a result, the content of sulfur preferably is 4 phr or less.

Here, it is preferable from the viewpoint of the bead durability in the heavy duty pneumatic radial tire that the rubber properties of two or more rubbers selected from the clinch rubber 20, the outer apex portion 8B and the carcass topping rubber, that is, the clinch rubber 20 and the outer apex portion 8B, the clinch rubber 20 and the carcass topping rubber, the outer apex portion 8B and the carcass topping rubber, or the clinch rubber 20, the outer apex portion 8B and the carcass topping rubber, should be restricted within the above-described range.

Figure 5:
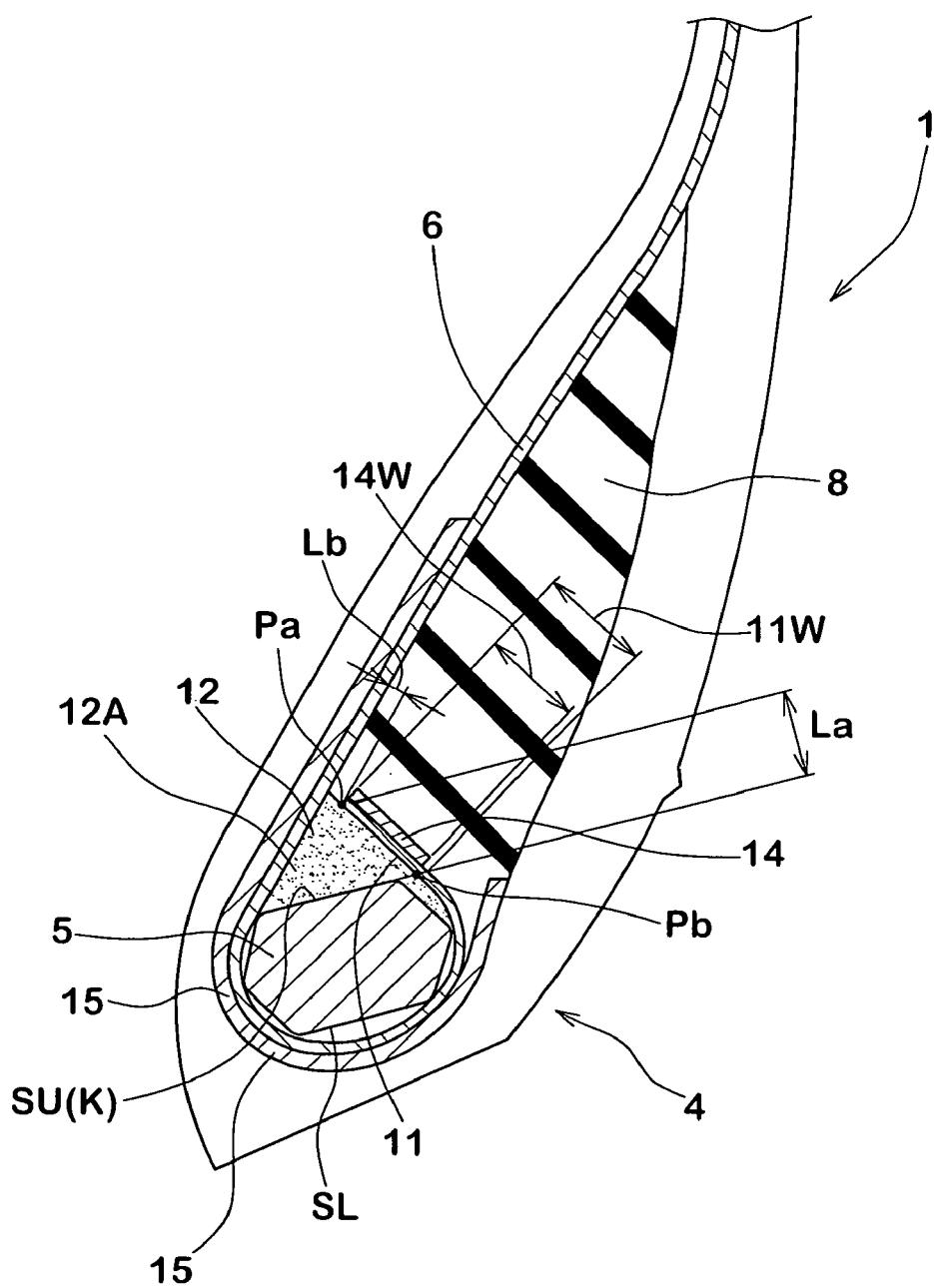
FIG. 5 is a cross-sectional view illustrating the case where a coated cord layer is provided.
Figure 6A:
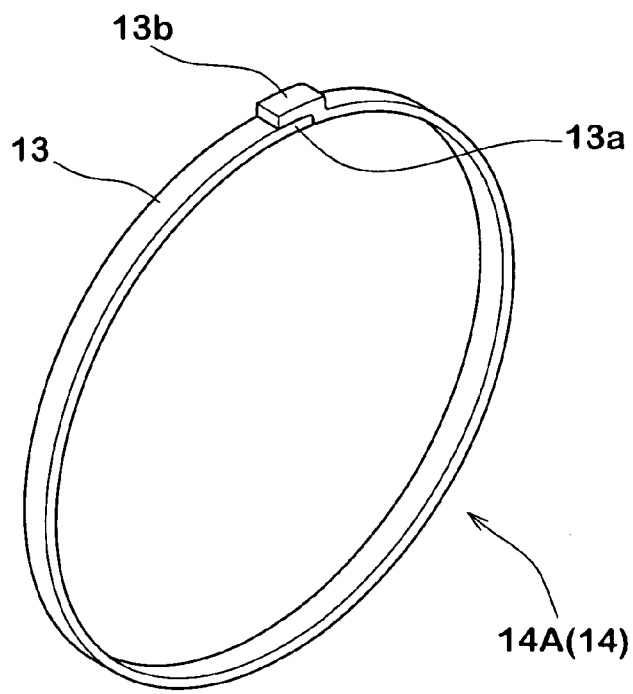
Figure 6B:
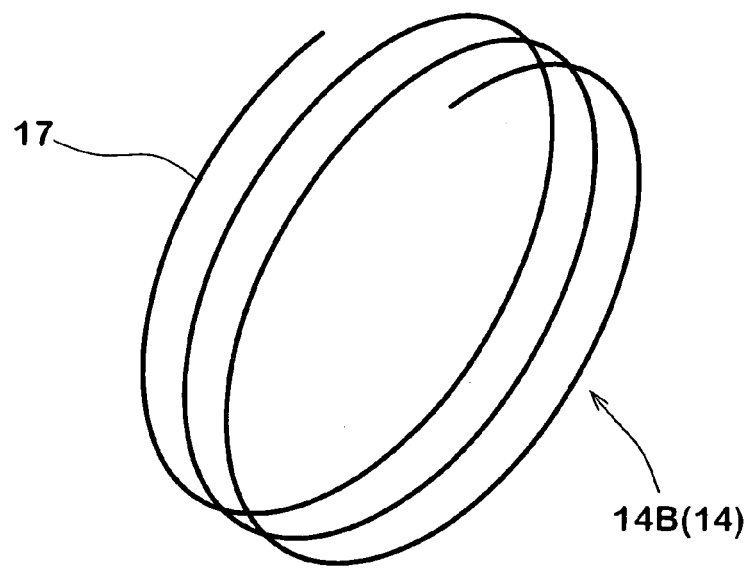

Referring to FIGS. 5 to 7, explanation will be made on mainly a tire provided with the above-described cord layer 14. The cord layer 14 is attached to the outer surface in the tire radial direction of the winding-up portion 11 and extends in the tire circumferential direction. In FIG. 5, the tire 1 is provided with the bead reinforcing layer 15 of a substantial u shape is disposed in the bead 4.

Although the winding-up portion 11 is formed into a linear shape, it may be formed into a bent or curved shape, like in the above-described preferred embodiment. The winding-up portion 11 satisfies the requirements such as the angle θ of 20 to 65 degrees, the distance La of 5 mm to 15 mm and the distance Lb of 1 mm to 5 mm, and further, the bead apex rubber 8 is formed as an integral unit rubber.

In the present preferred embodiment, the filled rubber 12 is formed of a basic portion 12A and a filling layer 12B. The basic portion 12A is of a substantially triangular shape as viewed in cross section disposed among the radial upper surface SU of the bead core 5, the winding-up portion 11 and the ply body 6a. The filling layer 12B is interposed between the inner surface Si in the tire axial direction of the bead core 5, the radial lower surface SL and the outer surface so in the tire axial direction of the bead core 5, and the main portion 10 of the ply folding portion 6b. Herein the present preferred embodiment, the main portion 10 of the ply folding portion 6b and a ridge of the bead core 5 approach each other, and the ridge of the bead core 5 is disposed in substantial contact with the inner circumference of the main portion 10. Namely, the filling layer 12B is formed in a small volume. Incidentally, the filled rubber 12 may be formed of only the basic portion 12A.

The cord layer 14 extends along the outer surface in the tire radial direction of the winding-up portion 11, wherein the cord layer 14 may be brought into contact with the outer surface or something may be interposed between the cord layer 14 and the outer surface. A width 14W of the cord layer 14 may be equal to a width 11W of the winding-up portion 11 in such a manner as to cover the inner end point Pa and the outer point Pb of the winding-up portion 11. Otherwise, the coated width 14W may be (½)×11W from the outer point Pb of the winding-up portion 11. Various modes can be adopted, for example, the cord layer 14 is readily wound by ½ to ¾ times of the width 11W from the width center of the winding-up portion 11.

In the present preferred embodiment, the cord of the cord layer 14 is arranged substantially in parallel in the tire circumferential direction. The above-described cord layer 14 serves to firmly position and hold the vicinity of the outer end of the winding-up portion 11 in cooperation with the filled rubber 12 so as to enhance the finishing accuracy of the tire after the vulcanization.

AS shown in, for example, FIG. 6A, as the cord layer 14 should be preferably used a winding ply 14A formed by lapping both ends 13a and 13b of a narrow reinforcing ply 13 and joining them to each other, or a jointless ply 14B formed by spirally winding one or a plurality of cords 17. The cord layer consists of a winding ply whose both ends are joined, and cords, at least the ends thereof may be fixed to prevent the loosing. The latter is much preferable with good productivity in order to cover the outer surface of the cone-like winding-up portion 11. Although the cord for use in the cord layer 14 is not particularly limited, an organic fiber cord made of polyester, nylon, rayon or aramid is preferable.

FIG. 7 schematically illustrates fabricating processes of the pneumatic radial tire according to the present invention.

Figure 7A:
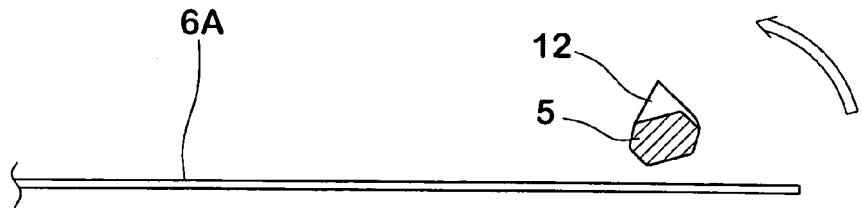
FIGS. 7A to 7E are cross-sectional views illustrating a fabricating method for forming the bead and the cord layer.
Figure 7B:
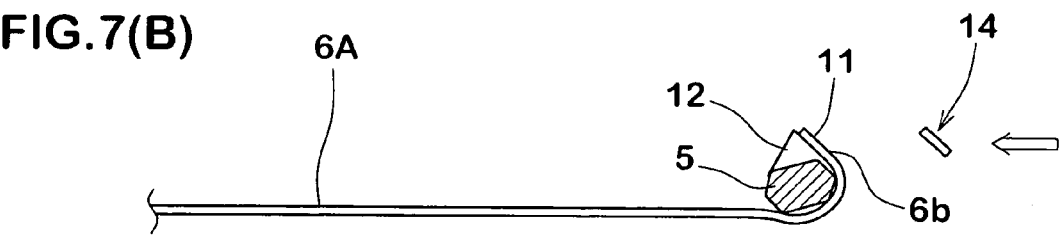
Figure 7C:
Figure 7D:
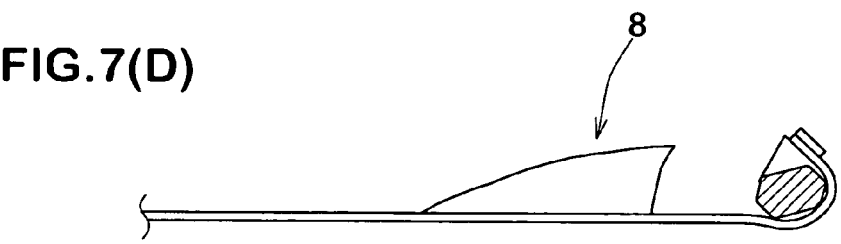
Figure 7E:
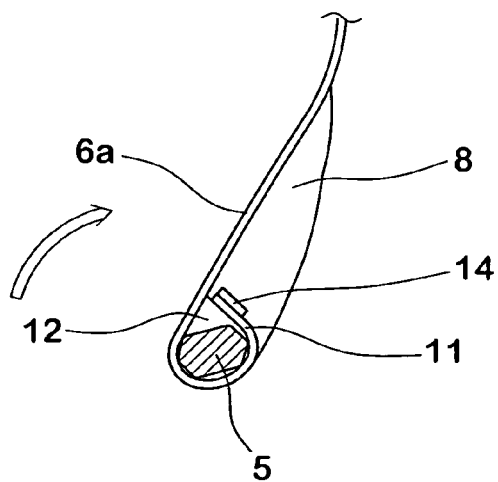
Figure 8:
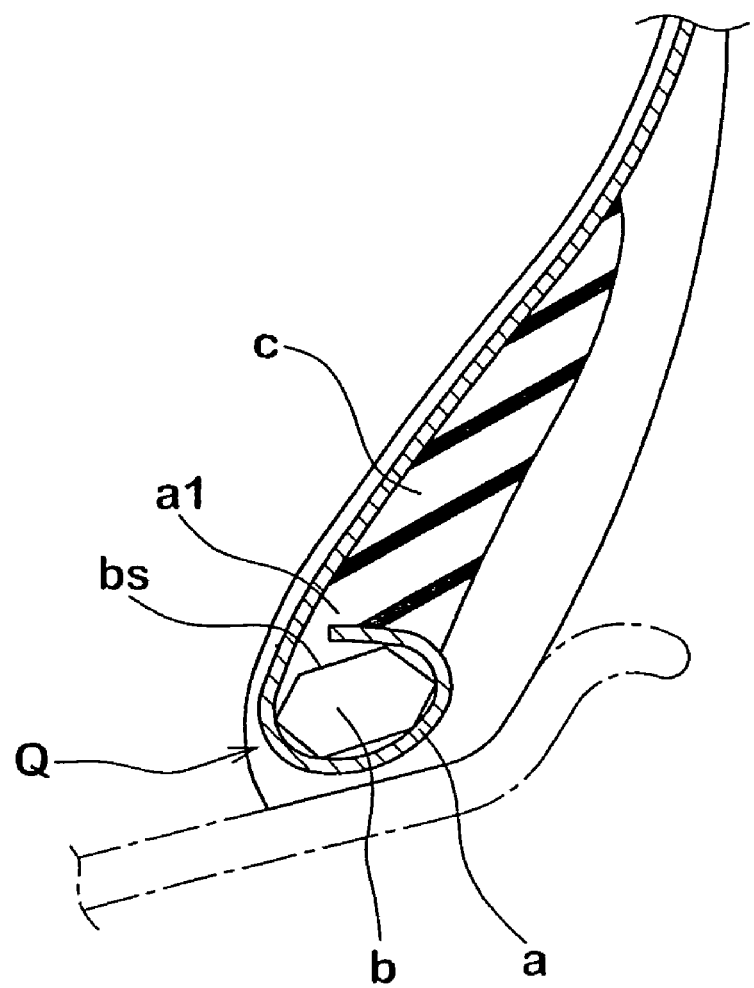
FIG. 8 is a cross-sectional view showing a conventional tire.

As illustrated in FIG. 7A, the carcass ply 6A is wound on a cylindrical drum, not shown, and further, a ring member, which is formed by previously integrating the bead core 5 and a filled rubber 12 with each other, is fitted to the carcass ply 6A from outside in the axial direction. Subsequently, as illustrated in FIG. 7B, the winding-up portion 11 is formed by folding both ends of the carcass ply 6A along the bead core 5 and the filled rubber 12, and then, the cord layer 14 is attached to the outer surface, as illustrated in FIG. 7C. The winding-up portion 11 is precisely folded and positioned by the filled rubber 12 and the cord layer 14. Particularly, the winding-up portion 11 need not be excessively folded along the outer surface of the bead core 5 by the filled rubber 12, as illustrated in FIG. 7D, thus achieving excellent moldability and suppressing the generation of creases. The bead apex 8, the sidewall rubber or a rubber chafer, not shown, is stuck onto the carcass ply 6A. Thereafter, as illustrated in FIG. 7E, the carcass ply 6A is expanded. In this manner, it is possible to provide the pneumatic radial tire having the configuration of the bead shown in FIG. 5.

EXAMPLE 1

A heavy duty tire (11R 22.5), having the structure shown in FIG. 1 based on specifications shown in Table 1 (without any coated cord layer) and a heavy duty tire (11R 22.5) based on specifications shown in Table 2 were prototyped, and further, the bead durabilities of the prototyped tires were measured for comparison. Here, specifications other than those shown in Tables were the same as each other.

Figure 11:
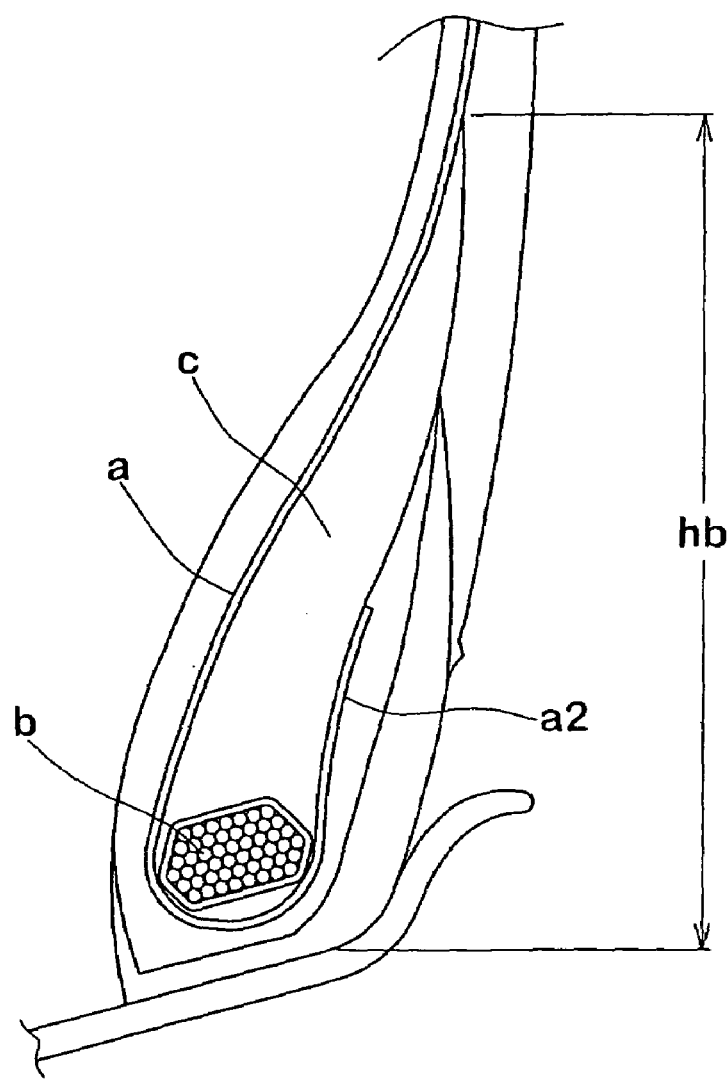
FIG. 11 is a cross-sectional view showing a conventional tire.

Incidentally, the prior art tire had a structure, in which a carcass winding-up portion a2 was wound along an outside surface of a bead apex rubber c, as shown in FIG. 11, wherein a height hb from a bead base line at the upper point of the bead apex c was 85 mm.

(1) Bead Durability:

<i> General Bead Durability:

The tire was made to travel at a speed of 30 km/h under the conditions of a rim (7.50×22.5), an inner pressure (700 kPa) and a vertical duty (27.25 kN×3) by a drum test machine. A traveling time until a damage occurred at the bead was indicated with an index in the prior art as 100. The greater the value, the more excellent the durability.

<ii> Thermal Bead Durability:

A bead durability test similar to the above-described test was carried out in a state in which a rim was heated up to 130 degrees. A traveling time until a damage occurred at the bead was indicated with an index in the prior art as 100. The greater the value, the more excellent the durability. Incidentally, in regard to thermal bead durability, a damage occurred from cord looseness at an inner end in the tire axial direction of the bead core.

TABLE 1

|  | Example A1 | Example A2 | Example A3 | Prior art |
|---|---|---|---|---|
| Core maximum width W (mm) | 17 | 17 | 17 | 17 |
| Bead structure | Bead wind | Bead wind | Bead wind | FIG. 11 |
| Distance La (mm) | 7 | 5.0 | 13.6 | — |
| (Ratio La/W) | 0.41 | 0.29 | 0.71 | — |
| Distance Lb (mm) | 2 | 2 | 2 | — |
| Filled rubber |  |  |  |  |
| Complex elasticity modulus Ea* (MPa) | 9 | 9 | 9 | — |
| Bead reinforcing layer | Provided | Provided | Provided | Provided |
| Height Hi (mm) | 27 | 27 | 27 | 27 |
| Height Ho (mm) | 27 | 27 | 27 | 27 |
| Bead strength |  |  |  |  |
| General bead durability | 120 | 130 | 115 | 100 |
| Thermal bead durability | 110 | 110 | 105 | 100 |

TABLE 2

|  | Example B1 | Example B2 | Example B3 | Prior art |
|---|---|---|---|---|
| Core maximum width W (mm) | 17 | 17 | 17 | 17 |
| Bead structure | Bead wind | Bead wind | Bead wind | FIG. 11 |
| Distance La (mm) | 7 | 5.5 | 10 | — |
| Distance Lb (mm) | 1.3 | 1.3 | 1.3 | — |
| Angle θ (degrees) | 40 | 30 | 65 | — |
| Filled rubber |  |  |  |  |
| Complex elasticity modulus Ea* (MPa) | 9 | 9 | 9 | — |
| Bead reinforcing layer | Provided | Provided | Provided | Provided |
| Height Hi (mm) | 27 | 27 | 27 | 27 |
| Height Ho (mm) | 27 | 27 | 27 | 27 |
| Bead strength |  |  |  |  |
| General bead durability | 120 | 130 | 115 | 100 |
| Thermal bead durability | 110 | 110 | 107 | 100 |

As shown in Tables 1 and 2, it is confirmed that the products in Examples are enhanced in both of the general bead durability and the thermal bead durability.

EXAMPLE 2

A heavy duty pneumatic radial tire having the basic configuration shown in FIG. 5 and a size of 11R 22.5 was prototyped based on specifications shown in Table 3, and further, tests were carried out with respect to drum durability and finishing accuracy. In regard to the distances La and Lb, a tire meridian cross section of a tire/rim assembly was photographed by a CT scanner in a normal state, and as a result, an average value of values at 10 points on the circumference of the tire was examined. A test method is as follows:

<Drum Durability Test>

A test tire was disposed in a regular rim with the application of an inner pressure of 800 kPa, and then, was made to travel on a drum at a speed of 20 km/h and a vertical duty of 75 kN. A traveling time was measured until a damage occurred, wherein a traveling time in a comparative example was used as an index of 100. The greater the value, the more excellent the durability.

<Riding Comfort>

A test tire was disposed in a regular rim with the application of an inner pressure of 800 kPa, and then, the tires were installed in all of wheels in a 16-ton truck, which was then made to travel on an asphalt test course in a state of a maximum carrying capacity. Thus, riding comfort was evaluated based on a 10-point level according to the feeling of a driver. The greater the value, the more excellent the riding comfort.

<Finishing Accuracy>

Images were photographed at 10 points in a tire circumferential direction in a normal state by a CT scanner. Deflections were obtained by dividing maximum fluctuations of the distances Lb and La by the rubber thickness La. The smaller the value, the more excellent the finishing accuracy.

Test results were shown below in Table 3.

TABLE 3

Figure 9:
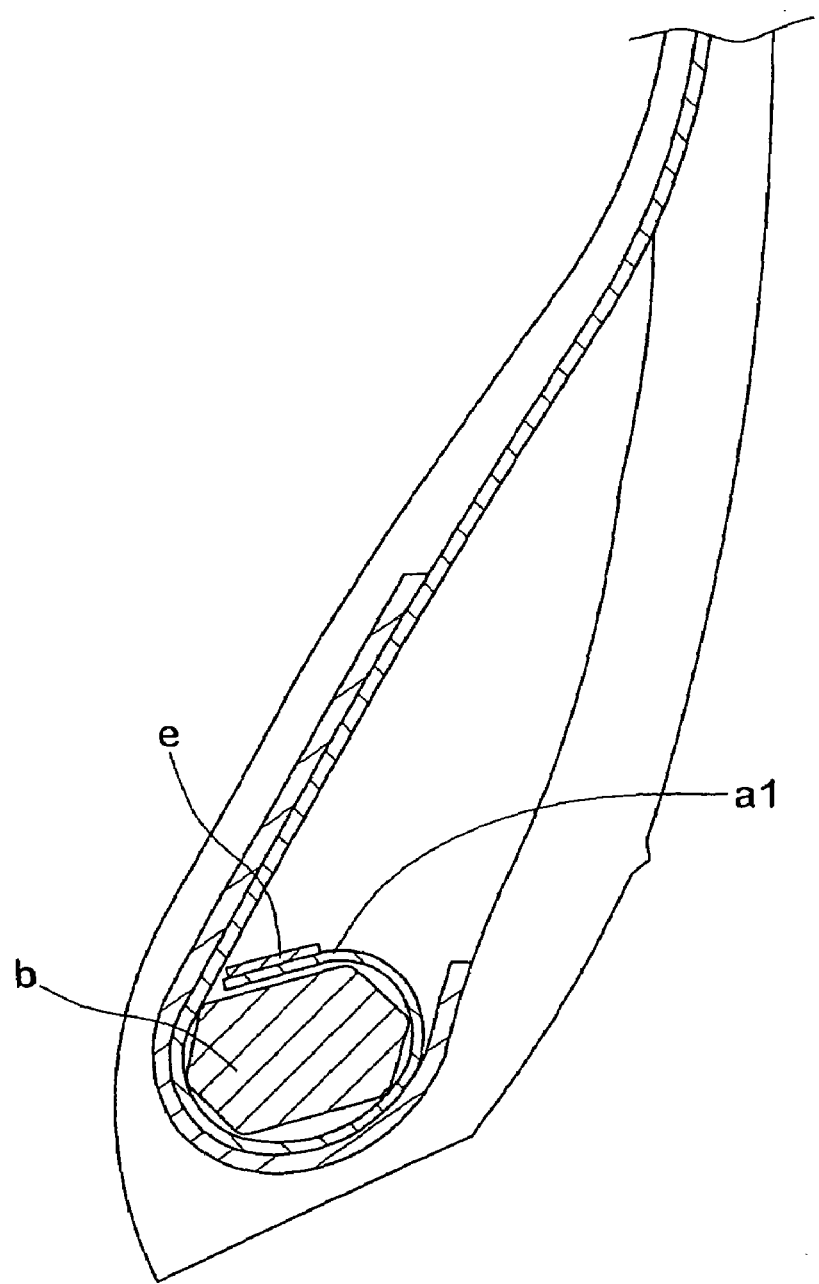
FIG. 9 is a cross-sectional view illustrating the conventional tire having a cord layer.
Figure 10:
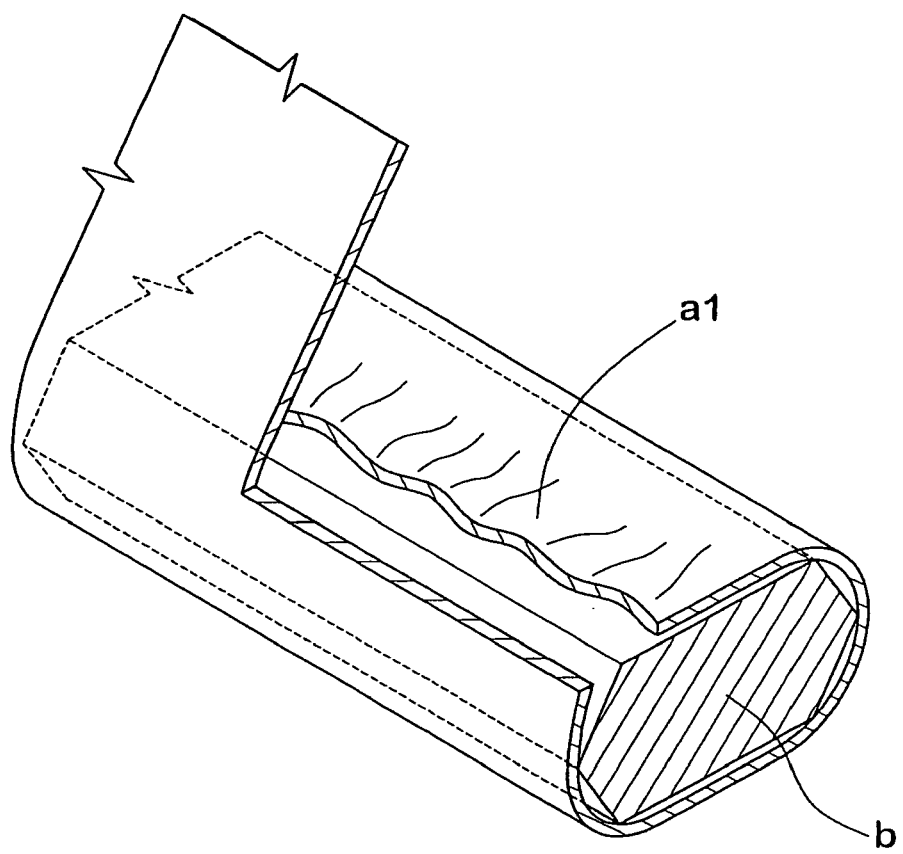
FIG. 10 is a perspective view illustrating a modification of a winding-up portion without a cord layer.

|  | Comparative Example 1 | Comparative Example 2 | Comparative Example 3 | Comparative Example 4 | Comparative Example 5 | Example 1 | Example 2 | Example 3 |
|---|---|---|---|---|---|---|---|---|
| Structural view of bead | FIG. 9 | FIG. 2 | FIG. 2 | FIG. 2 | FIG. 2 | FIG. 2 | FIG. 2 | FIG. 2 |
| Distance La (mm) | 0.5 | 3.2 | 15.9 | 7.3 | 13.7 | 6.2 | 7.0 | 10.0 |
| Distance Lb (mm) | 1.5 | 2.3 | 4.8 | 0.8 | 7.0 | 3.6 | 2.0 | 2.8 |
| Hardness hb (deg) of bead apex | 56 | 56 | 56 | 56 | 56 | 56 | 56 | 56 |
| Hardness ha (deg) of filled rubber | 70 | 70 | 70 | 70 | 70 | 70 | 70 | 70 |
| Test result Durability of bead (index) | 100 | 102 | 99 | 103 | 98 | 116 | 118 | 119 |
| Riding comfort (10-point level) | 7 | 7 | 7 | 7 | 7 | 7 | 7 | 7 |
| Finishing accuracy (%) | 210 | 94 | 31 | 41 | 36 | 43 | 40 | 35 |

As a result of the tests, it is found that the tires in Examples have the significantly enhanced durability of the bead. Furthermore, it can be confirmed that the finishing accuracy at the outer end of the winding-up portion is high.

EXAMPLE 3

A heavy duty tire (11R 22.5) having the structure shown in FIG. 1 based on specifications shown in Table 4 and a heavy duty tire (11R 22.5) having the structure shown in FIG. 1 based on specifications shown in Table 5 were prototyped, and further, the bead durabilities of the prototyped tires were measured for comparison. Here, specifications other than those shown in Tables were the same as each other. No coated cord layer was provided in the tire.

Incidentally, the prior art tire had a structure, in which a carcass winding-up portion was wound along an outside surface of a bead apex rubber, as shown in FIG. 11, wherein the height hb from a bead base line at top of the bead apex rubber c was 65 mm.

(1) Bead Durability:

<i> General Bead Durability:

The tire was made to travel at a speed of 30 km/h under the conditions of a rim (7.50×22.5), an inner pressure (700 kPa) and a vertical duty (27.25 kN×3) by a drum test machine. A traveling time until a damage occurred at the bead was indicated with an index in the prior art as 100. The greater the value, the more excellent the durability.

<ii> Thermal Bead Durability:

A bead durability test similar to the above-described test was carried out in a state in which a rim was heated up to 130 degrees. A traveling time until a damage occurred at the bead was indicated with an index in the prior art as 100. The greater the value, the more excellent the durability. Incidentally, in regard to thermal bead durability, a damage occurred from cord looseness at an inner end in the tire axial direction of the bead core.

TABLE 4

|  | Example A1 | Example A2 | Example A3 | Prior art |
|---|---|---|---|---|
| Bead structure Winding-up portion | Bead wind | Bead wind | Bead wind | FIG. 11 |

TABLE 4-continued

|  | Example A1 | Example A2 | Example A3 | Prior art |
|---|---|---|---|---|
| Height L1 (mm) | 20 | 14.6 | 25 | 65 |
| (Ratio L1/L0) | 0.096 | 0.07 | 0.12 | 0.31 |
| Distance La (mm) | 7 | 7 | 7 | — |
| Distance Lb (mm) | 2 | 2 | 2 | — |
| Filled rubber |  |  |  |  |
| Complex elasticity modulus Ea* (MPa) | 8.0 | 8.0 | 8.0 | — |
| Bead reinforcing layer |  |  |  |  |
| Height Hi (mm) | 27 | 27 | 27 | 27 |
| Height Ho (mm) | 27 | 27 | 27 | 27 |
| Bead strength |  |  |  |  |
| General bead durability | 120 | 115 | 110 | 100 |
| Thermal bead durability | 110 | 115 | 105 | 100 |

*Height L0 from bead base line of ply body: 208 mm

TABLE 5

|  | Example B1 | Example B2 | Example B3 | Prior art |
|---|---|---|---|---|
| Bead structure Winding-up portion | Bead wind | Bead wind | Bead wind | FIG. 11 |
| Distance La (mm) | 7 | 7 | 7 | — |
| Distance Lb (mm) | 2 | 2 | 2 | — |
| Filled rubber |  |  |  |  |

TABLE 5-continued

|  | Example B1 | Example B2 | Example B3 | Prior art |
|---|---|---|---|---|
| Complex elasticity modulus Ea* (MPa) | 8.0 | 8.0 | 8.0 | — |
| Bead reinforcing layer |  |  |  |  |
| Height Hi (mm) | 27 | 27 | 27 | 27 |
| Height Ho (mm) | 27 | 27 | 27 | 27 |
| Tensile strength T0 of bead core (KN) | 170 | 170 | 170 | 170 |
| Carcass cord |  |  |  |  |
| Tensile strength T1 (KN) | 1.2 | 1.01 | 1.46 | — |
| (Ratio T1/T0) | 0.0071 | 0.0059 | 0.0086 | — |
| Embedding number (pieces/5 cm) | 35 | 35 | 35 | — |
| Bead strength |  |  |  |  |
| General bead durability | 120 | 110 | 118 | 100 |
| Thermal bead durability | 110 | 110 | 118 | 100 |

As shown in Tables 4 and 5, it is confirmed that the products in Examples are enhanced in both of the general bead durability and the thermal bead durability.

EXAMPLE 4

Heavy duty tires (11R 22.5), each having the structure shown in FIG. 1, based on specifications shown in Tables 6 to 8 (without any cord layer) were prototyped, and further, the bead durabilities of the prototyped tires were measured for evaluation. Here, specifications other than those shown in Tables 6 to 8 were the same as each other. Moreover, rubber compositions of a clinch rubber, an outer apex portion and a carcass topping rubber used in Examples 1A, 1B and 1C shown in Tables 6 to 8, respectively, are illustrated in Table 9.

Incidentally, the prior art tire had a structure, in which a carcass winding-up portion was wound along an outside surface of a bead apex rubber, as shown in FIG. 11, wherein the height hb from a bead base line at the top point of bead apex rubber c was 65 mm.

(1) Bead Durability:

<i> General Bead Durability:

The tire was made to travel at a speed of 30 km/h under the conditions of a rim (7.50×22.5), an inner pressure (700 kPa) and a vertical duty (27.25 kN×3) by a drum test machine. A traveling time until a damage occurred at the bead was indicated with an index in the prior art as 100. The greater the value, the more excellent the durability.

<ii> Thermal Bead Durability:

A bead durability test similar to the above-described test was carried out in a state in which a rim was heated up to 130 degrees. A traveling time until a damage occurred at the bead was indicated with an index in the prior art as 100. The greater the value, the more excellent the durability. Incidentally, in regard to thermal bead durability, a damage occurred from cord looseness at an inner end in the tire axial direction of the bead core.

TABLE 6

|  | Prior art | Example A1 | Comparative Example A1 | Comparative Example A2 | Comparative Example A3 |
|---|---|---|---|---|---|
| Bead structure | FIG. 5 | Bead Wind | Bead Wind | Bead Wind | Bead Wind |
| Distance La (mm) | — | 6 | 6 | 6 | 6 |
| Distance Lb (mm) | — | 2 | 2 | 2 | 2 |
| Bead reinforcing layer |  |  |  |  |  |
| Height Hi (mm) | 27 | 27 | 27 | 27 | 27 |
| Height Ho (mm) | 27 | 27 | 27 | 27 | 27 |
| Clinch rubber |  |  |  |  |  |
| Complex elasticity modulus Ec* (MPa) | — | 12.0 | 15.0 | 7.5 | 16.0 |
| Tensile strength × elongation at time of cutting | — | 5500 | 2500 | 7000 | 3000 |
| Bead strength |  |  |  |  |  |
| General bead durability | 100 | 120 | 85 | 90 | 90 |

TABLE 7

|  | Prior art | Example B1 | Comparative Example B1 | Comparative Example B2 | Comparative Example B3 | Comparative Example B4 |
|---|---|---|---|---|---|---|
| Bead structure | FIG. 11 | Wind bead | Wind bead | Wind bead | Wind bead | Wind bead |
| Distance La (mm) | — | 6 | 6 | 6 | 6 | 6 |
| Distance Lb (mm) | — | 2 | 2 | 2 | 2 | 2 |
| Bead reinforcing layer |  |  |  |  |  |  |
| Height Hi (mm) | 27 | 27 | 27 | 27 | 27 | 27 |
| Height Ho (mm) | 27 | 27 | 27 | 27 | 27 | 27 |
| Outer apex portion |  |  |  |  |  |  |

TABLE 7-continued

|  | Prior art | Example B1 | Comparative Example B1 | Comparative Example B2 | Comparative Example B3 | Comparative Example B4 |
|---|---|---|---|---|---|---|
| Complex elasticity modulus Eb2* (MPa) | — | 4.0 | 2.8 | 11.0 | 3.2 | 8.0 |
| 100% modulus (MPa) | — | 3.5 | 2.5 | 5.0 | 1.9 | 4.1 |
| Bead strength |  |  |  |  |  |  |
| General bead durability | 100 | 120 | 95 | 100 | 95 | 100 |

TABLE 8

|  | Prior art | Example C1 | Comparative Example C1 | Comparative Example C2 | Comparative Example C3 |
|---|---|---|---|---|---|
| Bead structure | FIG. 11 | Bead Wind | Bead Wind | Bead Wind | Bead Wind |
| Distance La (mm) | — | 6 | 6 | 6 | 6 |
| Distance Lb (mm) | — | 2 | 2 | 2 | 2 |
| Bead reinforcing layer |  |  |  |  |  |
| Height Hi (mm) | 27 | 27 | 27 | 27 | 27 |
| Height Ho (mm) | 27 | 27 | 27 | 27 | 27 |
| Carcass topping rubber |  |  |  |  |  |
| Complex elasticity modulus Ed* (MPa) | — | 8.0 | 4.5 | 14.0 | 8.0 |
| Content of sulfur (Mhr) | — | 5 | 2.1 | 3.5 | 1.9 |
| Bead strength |  |  |  |  |  |
| General bead durability | 100 | 120 | 100 | 95 | 115 |
| Thermal bead durability | 100 | 120 | 95 | 110 | 95 |

TABLE 9

|  | Example A1 Clinch rubber | Example B1 Outer apex | Example C1 Topping rubber |
|---|---|---|---|
| Rubber |  |  |  |
| Natural rubber | 40 | 100 | 100 |
| BR | 60 | 0 | 0 |
| Carbon | 70 (N220) | 45 (N550) | 60 (N326) |
| Zinc oxide | 5 | 6 | 10 |
| Stearic acid | 2 | 2 | 0 |
| Cobalt stearate | 0 | 0 | 1.5 |
| Aromatic oil | 2 | 2 | 0 |
| Anti-aging agent | 0 | 0 | 2 |
| Sulfur | 1 | 2.5 | 5 |
| Vulcanization accelerator | 3 | 1 | 1 |
| Complex elasticity modulus MPa | 12 | 4 | 8 |

The invention claimed is:

1. A heavy duty pneumatic radial tire including a carcass ply, in which a ply folding portion folded from inside to outside in a tire axial direction around a bead core is successively disposed in a ply body extending from a tread to the bead core in a bead via a sidewall;
the ply folding portion including a main portion folded along an inside surface in the tire axial direction of the bead core, a lower surface in a radial direction and an outside surface in the tire axial direction, and a winding-up portion extending continuously to the main portion and apart from the bead core;
wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm,
and the bead core has a core maximum width W of 15 mm to 19 mm, the ratio La/W of the distance La from the upper surface in the radial direction of the bead core at the inner end point of the winding-up portion to the core maximum width W ranging from 0.26 to 0.80.

2. A heavy duty pneumatic radial tire according to claim 1, wherein the winding-up portion includes a cord layer passing through the outer surface in the tire radial direction.

3. A heavy duty pneumatic radial tire according to claim 2, wherein the cord layer consists of a winding ply whose both ends are joined.

4. A heavy duty pneumatic radial tire according to claim 2, wherein the cord layer consists of a jointless ply formed by spirally winding one or a plurality of cords.

5. A heavy duty pneumatic radial tire including a carcass ply, in which a ply folding portion folded from inside to outside in a tire axial direction around a bead core is successively disposed in a ply body extending from a tread to the bead core in a bead via a sidewall;
the ply folding portion including a main portion folded along an inside surface in the tire axial direction of the bead core, a lower surface in a radial direction and an outside surface in the tire axial direction, and a winding-up portion extending continuously to the main portion and apart from the bead core;
wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm, and in the winding-up portion, the ratio L1/L0 of a radial height L1 from a base line at the inner end position of the winding-up position to a radial height L0 form the bead base line at an inner surface of the ply body on a tire equator is set to 0.07 to 0.12.

6. A heavy duty pneumatic radial tire including a carcass ply, in which a ply folding portion folded from inside to outside in a tire axial direction around a bead core is successively disposed in a ply body extending from a tread to the bead core in a bead via a sidewall;

the ply folding portion including a main portion folded along an inside surface in the tire axial direction of the bead core, a lower surface in a radial direction and an outside surface in the tire axial direction, and a winding-up portion extending continuously to the main portion and apart from the bead core;

wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20° to 65° with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm, and the bead core has a tensile strength TO of 150 kN to 270 kN, and further, a tensile strength T1 per carcass cord is set 0.0045 to 0.0086 times the tensile strength TO of the bead core and the implanting number carcass cords is set to 30 pieces to 45 pieces per 5 cm in the winding-up portion.

7. A heavy duty pneumatic radial tire including a carcass ply, in which a ply folding portion folded from inside to outside in a tire axial direction around a bead core is successively disposed in a ply body extending from a tread to the bead core in a bead via a sidewall;

the ply folding portion including a main portion folded along an inside surface in the tire axial direction of the bead core, a lower surface in a radial direction and an outside surface in the tire axial direction, and a winding-up portion extending continuously to the main portion and apart from the bead core;

wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm and the bead includes a bead apex rubber extending outward in the tire radial direction from the bead core via the winding-up portion and a clinch rubber having a complex elasticity modulus EC* of 8 MPa at 70° C. and a product of the tensile strength (in MPa) at 23° C. and an elongation (in %) at the time of cutting ranging from 4,000 to 12,000, the clinch rubber being provided in a region in contact with a rim.

8. A heavy duty pneumatic radial tire according to claim 7, wherein the bead apex rubber includes a lower apex rubber portion rising from the winding-up portion inside in the radial direction and an upper apex rubber portion located radially outside of the lower apex rubber portion, the outer apex portion having a complex elasticity modulus Eb2* of 3 MPa to 10 Mpa at 70° C. and a 100% modulus of 2.0 MPa to 4.0 MPa at 23° C.

9. A heavy duty pneumatic radial tire including a carcass ply, in which a ply folding portion folded from inside to outside in a tire axial direction around a bead core is successively disposed in a ply body extending from a tread to the bead core in a bead via a sidewall;

the ply folding portion including a main portion folded along an inside surface in the tire axial direction of the bead core, a lower surface in a radial direction and an outside surface in the tire axial direction, and a winding-up portion extending continuously to the main portion and apart from the bead core;

wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm and the bead includes a bead apex rubber extending outward in the tire radial direction from the bead core via the winding-up portion and a clinch rubber provided in a region in contact with a rim, wherein the bead apex rubber includes a lower apex rubber portion rising from the winding-up portion inside in the radial direction and an upper apex rubber portion located radially outside of the lower apex rubber portion, the outer apex portion having a complex elasticity modulus Eb2* of 3 MPa to 10 MPa at a temperature of 70° C. and a 100% modulus of 2.0 MPa to 4.0 MPa at a temperature of 23° C.

10. A heavy duty pneumatic radial tire including a carcass ply, in which a ply folding portion folded from inside to outside in a tire axial direction around a bead core is successively disposed in a ply body extending from a tread to the bead core in a bead via a sidewall;

the ply folding portion including a main portion folded along an inside surface in the tire axial direction of the bead core, a lower surface in a radial direction and an outside surface in the tire axial direction, and a winding-up portion extending continuously to the main portion and apart from the bead core;

wherein the winding-up portion having an intervening filled rubber between an upper surface in a radial direction of the bead core, extends with an inclination of an angle θ in a direction in which a diameter is increased inward in the tire axial direction in a state in which a tire is rimmed in a regular rim and an inner pressure of 50 kPa is filled, the angle θ being set to 20 to 65 degrees with respect to an upper surface in the radial direction of the bead core, a distance La from the upper surface in the radial direction of the bead core at the inner end point of the winding-up portion being set to 5 mm to 15 mm, and a distance Lb between the inner end point of the winding-up portion and the ply body being set to 1 mm to 5 mm, and topping rubber in the carcass ply has a complex elasticity modulus Ed* of 5 Mpa to 13 Mpa at a temperature of 70° C. and contains 2 phr or more of sulfur.

* * * * *